No. 856,635. PATENTED JUNE 11, 1907.
W. HAZZARD.
FORK.
APPLICATION FILED MAR. 27, 1907.
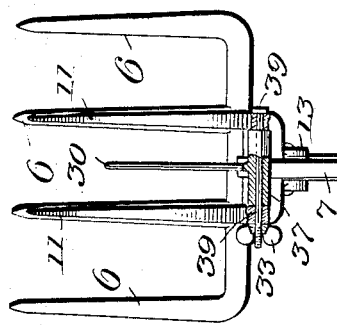
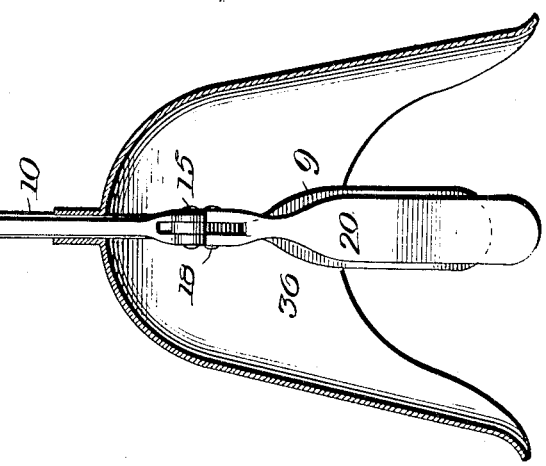
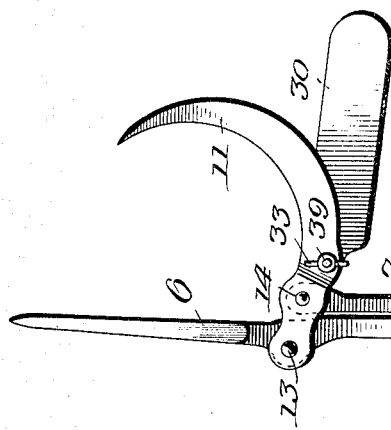
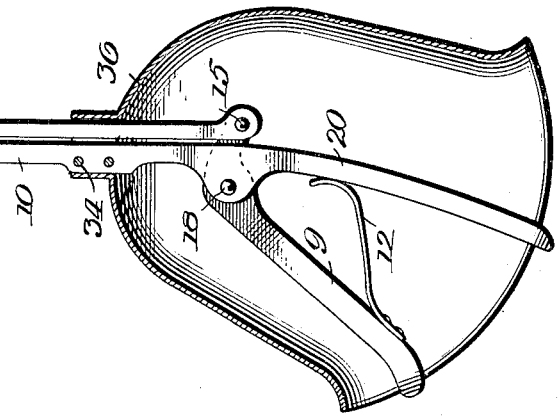
William Hazzard, Inventor

UNITED STATES PATENT OFFICE.

WILLIAM HAZZARD, OF LORAIN, OHIO.

FORK.

No. 856,635.          Specification of Letters Patent.          Patented June 11, 1907.

Application filed March 27, 1907. Serial No. 364,794.

*To all whom it may concern:*

Be it known that I, WILLIAM HAZZARD, a citizen of the United States, residing at Lorain, in the county of Lorain and State of Ohio, have invented certain new and useful Improvements in Forks, of which the following is a specification.

This invention is a combined fork, grapple and knife, intended particularly for handling all kinds of meats, vegetables, hot dishes and the like, or in fact anything which it is desired to lift or move without contact or grasping of the hands. For example, when meat is taken from a boiler it frequently slips from a straight fork and falls back into the water, causing a splash which is apt to scald the cook. By means of the present device meat can be lifted from boiling water, or from a baking pan, without danger of scalding or burning the hands. The knife attachment serves to cut strings around roasts and the like, and can be utilized in various other ways. A shield is also provided which incloses the handles and prevents exposure of the hand to hot grease and the like.

The invention is illustrated in the accompanying drawings, in which

Figure 1 is a side view of the implement in open position. Fig. 2 is a plan view thereof in closed position.

Referring specifically to the drawings, 10 indicates a shank provided at the front end with a set of tines 6 forming a straight fork, and at the rear end with a handle 20.

At 11 are indicated a pair of curved fingers which work to and from the tines and are adapted to grasp or hook meats or other substances or articles, which it may be desired to lift. These fingers are pivoted at 13 to opposite sides of the shank 10 and are connected by a rod 7 to a hand lever 9 opposite the handle. The rod is pivoted at 14 to the fingers and at 15 to the hand lever, which lever is pivoted at 18 to the shank. The lever projects in opposite position to the handle 20, and a spring 12 is located therebetween and acts to normally hold the fingers open.

At 30 is indicated a knife blade which is or may be sharpened on both edges and which projects laterally behind the fingers 11. This blade projects from or is formed integral with a cross sleeve 37 which has a square bore to receive a square bolt 39 by which it is fastened to the fingers 11. A thumb nut 33, on the end of the bolt, serves to hold the parts together.

The handle 20 and hand lever 9 are inclosed or protected by means of a bell-shaped shield 36 which is riveted to the shank 10 at 34. The rod 7 works lengthwise through an opening in the front end of the shield, so that the fingers may be opened or closed, that is, swung to or from the tines 6, by operation of the hand lever. The fingers 11, as well as the tines 6, are sharpened at the front ends so that they will take into and engage pieces of meat or other substance.

In use, for example, in lifting meat from a boiler or baking pan, the tines 6 are thrust into the meat and the fingers 11 closed to grasp the same. This gives a sure hold on the meat, and it may be lifted and carried with convenience and safety. For cutting strings or vegetables, trimming meats, and the like, the blade 30 can be used. The square bolt 39 prevents the knife turning. If the knife is not needed it can be detached by unscrewing and removing the bolt.

I claim:

A grappling fork having spaced grasping fingers, a blade projecting laterally therefrom and having a tubular sleeve at the heel thereof extending across between the fingers, and a clamping bolt extending through the fingers and the sleeve.

In testimony whereof I do affix my signature, in presence of two witnesses.

WILLIAM HAZZARD.

Witnesses:
    GEO. D. CLARKE,
    ROSCOE C. WIXSON.